INVENTOR
Charles A. Baresch

May 10, 1949.    C. A. BARESCH    2,469,711
FAIRING ASSEMBLY FOR TURBINE BEARINGS
Filed Aug. 23, 1944    3 Sheets-Sheet 2

INVENTOR
Charles A. Baresch

Patented May 10, 1949

2,469,711

UNITED STATES PATENT OFFICE 2,469,711

FAIRING ASSEMBLY FOR TURBINE BEARINGS

Charles A. Baresch, Hartford, Conn., assignor to United Aircraft Corporation, East Hartford, Conn., a corporation of Delaware Application August 23, 1944, Serial No. 550,870

11 Claims. (Cl. 308—15)

This invention relates to a fairing assembly for the bearing of a turbine.

The copending application of Soderberg, Serial No. 520,066, filed January 28, 1944, now Patent No. 2,417,845, dated March 25, 1947, describes an axial flow turbine having, at one end, a bearing mounting with radially extending legs between which the power fluid from the turbine is discharged. The mounting and legs are covered by a fairing which shields the mounting and defines a path for the power fluid. A feature of the present invention is a fairing which can be readily assembled in position and which can be removed without destroying the mounting.

If the fairing is welded directly to the mounting, it cannot be removed except by destruction of both fairing and mounting. A feature of the invention is a fairing which is not integrally attached to the mounting.

Another feature is a fairing which permits access to opposite ends of the bearing.

A feature of the invention is the construction of the fairing from a number of similar sections which are secured together. Another feature is the attachment of the fairing to the mounting to form an airtight chamber around the mounting.

Another feature of the invention is a fairing assembly which will permit the assembly of the labyrinth seal within the mounting without removal of the fairing. In this way the rotating seal elements, the sleeve carrying these elements, and the outer seal elements may all form a sub-assembly within the mounting.

Other objects and advantages will be apparent from the specification and claims, and from the accompanying drawings which illustrate an embodiment of the invention.

Figure 1:
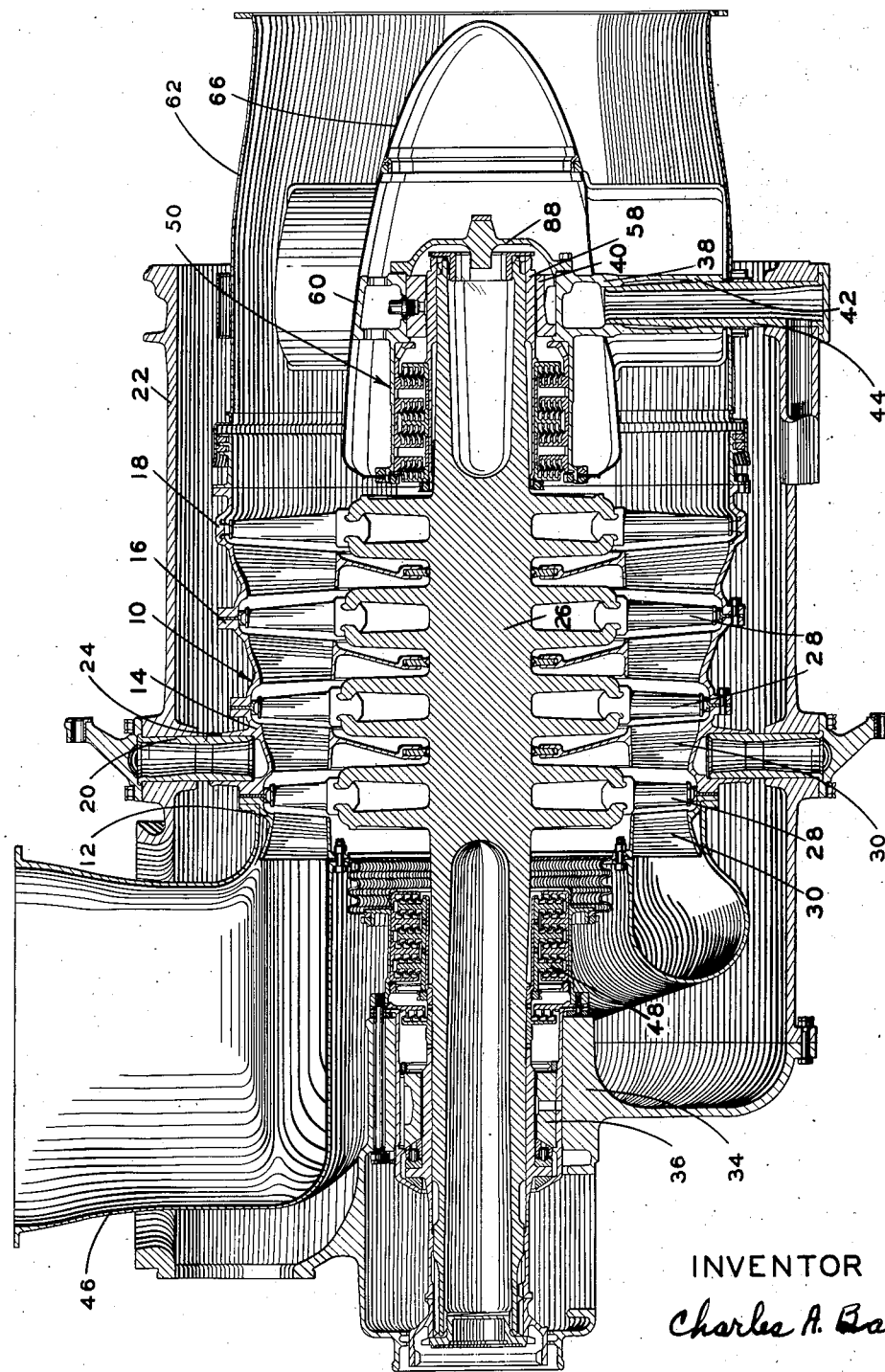
Fig. 1 is a sectional view of the turbine.

The turbine shown includes a casing 10 built up of rings 12, 14, 16, and 18 supported by radial pins 20 in a housing 22. These pins, which are all in substantially the same plane and which constitute the support for the casing within the housing, engage bores in bosses 24 in one ring 14 of the casing. Rotor 26 within the casing has a number of rows of blades 28 alternating with the rows of nozzles 30 in the casing.

Housing 22 has a head 34 which forms a part of the housing and supports a bearing sleeve 36 for the front end of rotor 26. At the other end of the turbine, the housing 22 supports a mounting 38 within which is a bearing 40 for the shaft. The mounting has a number of legs 42 engaging radial pins 44, Fig. 1, in the housing.

Gas enters the turbine through an inlet scroll 46 attached to the end of casing 10. Leakage of power gas around the ends of the turbine shaft is prevented by labyrinth seals 48 and 50 which surround the shaft. The rear seal includes a number of stationary elements 52 fitting within a sleeve 54 integral with the mounting 38, and these stationary elements cooperate with a number of interfitting rotary elements 56 mounted on the bearing sleeve 58 which fits on the end of the turbine shaft.

A fairing 60 extends around the mounting and in conjunction with a duct 62 defines an annular path for the gas discharging from the turbine. This fairing is so constructed that it forms a substantially airtight enclosure for the mounting and is adapted to be placed on the mounting after the latter has been completely machined.

Figure 3:
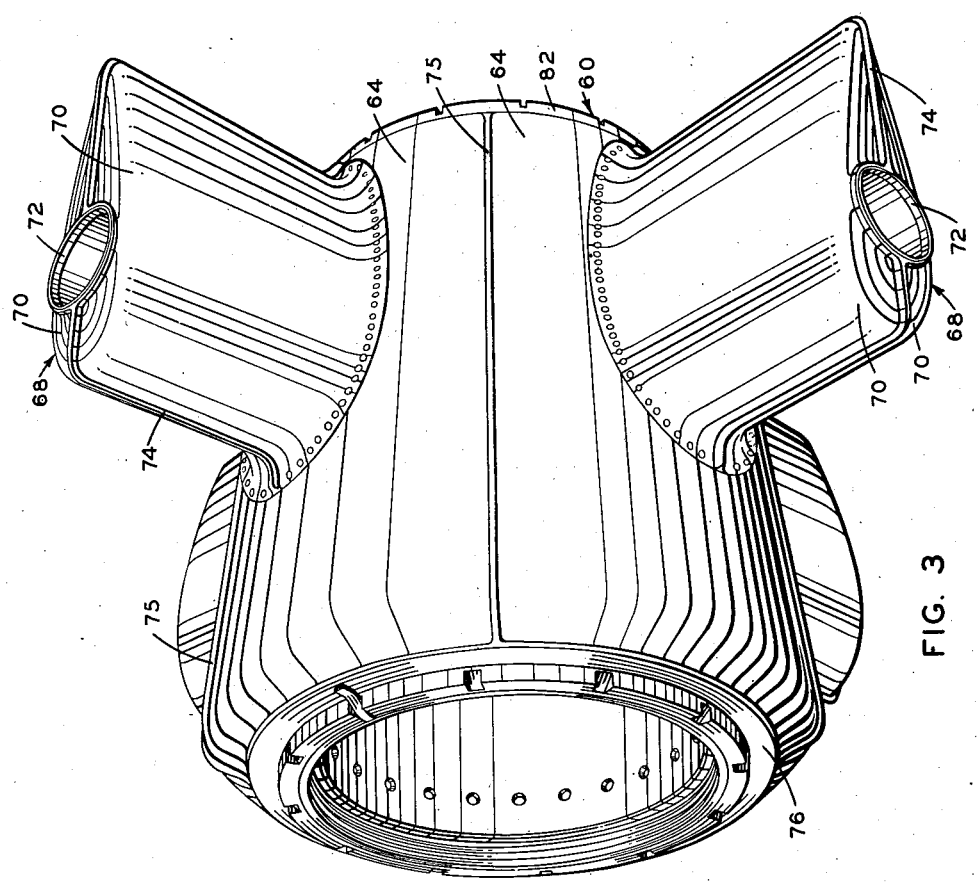
Fig. 3 is a perspective view of the fairing with the end cap removed.

The fairing is made up of a number of similar segments 64, Fig. 3, each of which has an opening 66 through which one of the projecting legs on the mounting extends. A subfairing 68 extends around the leg and has its inner edge attached to the fairing segment around the opening 66. The subfairing is made up of two opposed plates 70 attached together at leading and trailing edges. These plates are shaped to have their outer edges adjoining and connected together leaving an opening 72 to receive and to have a tight fit with the outer end of the projecting leg. Each of the plates 70 has a flange 74 along the edge which adjoins the opposed plate and which permits welding of the two plates together in forming an airtight connection.

Figure 2:
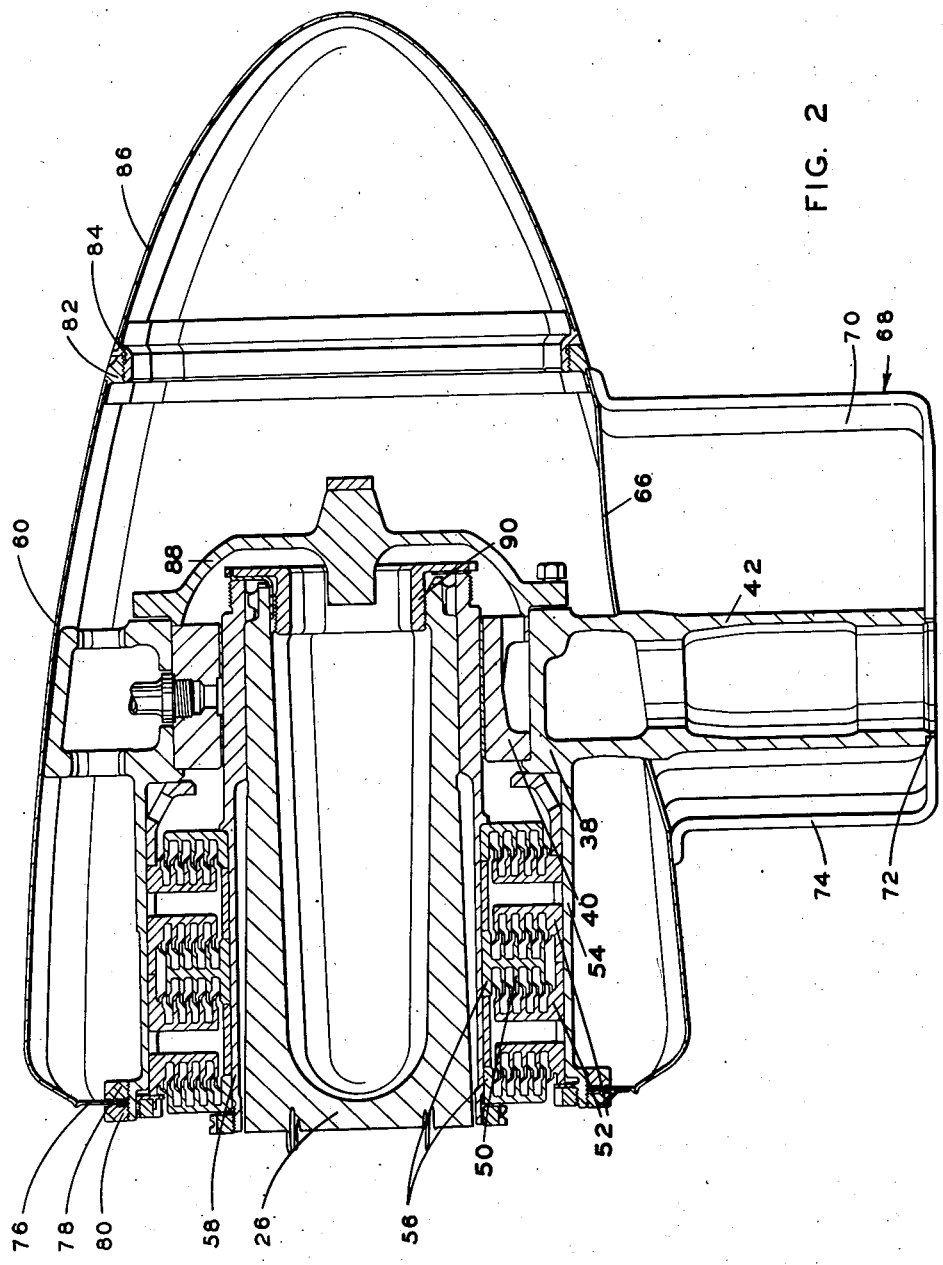
Fig. 2 is a sectional view on a larger scale of the rear mounting and fairing.

After the subfairing for the leg of the mounting is attached to the associated fairing segment 64, the several segments are placed in position on the mounting and the adjoining flanged edges 75 of the segments are welded together. The leading edges of the segments are then welded to a disc 76, Fig. 2, clamped between threaded rings 78 and 80 on the sleeve 54 which is integral with the mounting. In this way, a substantially airtight connection is formed between the leading edge of the fairing and the mounting.

The trailing edges of the fairing segments are permanently connected, as by welding, to a threaded ring 82 which receives a cooperating ring 84 on a dome or cap 86 which closes the trailing end of the fairing and assists in producing a streamlined surface for the gas flow.

Since the cap may be removed from the fairing, access to the rear end of the turbine shaft is permitted to provide for easy assembly and disassembly of the turbine. Ring 82 is made large enough in diameter to permit removal of an end cap 88 which is attached to mounting 38 and covers the end of the turbine shaft.

Since the fairing is clamped at its leading edge to the mounting, it is clear that this attachment does not affect the accuracy of the previously machined surfaces on the mounting and permits complete machining of the mounting prior to assembly of the surrounding fairing. In addition, since the connections between the fairing and the mounting are substantially airtight it is possible to maintain within the fairing a circulation of air to prevent transfer of heat from the fairing to the bearing and also permit the air within the fairing to be under pressure to prevent leakage of the power gas into the fairing.

The mounting 38, with the bearing 40, seal 50, and bearing sleeve 56 together with the surrounding fairing forms a subassembly which may be mounted as a unit in the turbine structure. The end cap 86, when removed, permits access to the end of the turbine shaft for positioning a clamping ring 90 for bearing sleeve 56, and the end cap 88.

It is to be understood that the invention is not limited to the specific embodiment herein illustrated and described, but may be used in other ways without departure from its spirit as defined by the following claims.

I claim:

1. A fairing for a bearing mounting having a number of radially projecting legs, said fairing including a number of similar segments extending around the mounting and secured to each other on adjoining edges to form an enclosure for the mounting, each segment having a projecting fairing connected thereto and adapted to extend around a radially extending leg on the mounting.

2. A fairing for a bearing mounting having a number of radially projecting legs, said fairing including a number of similar segments extending around the mounting and secured to each other on adjoining edges to form an enclosure for the mounting, each segment having a projecting fairing connected thereto and adapted to extend around a radially extending leg on the mounting, each projecting fairing including opposed plates connected together at leading and trailing edges.

3. A fairing for a bearing mounting having a number of radially projecting legs, said fairing including a number of similar segments extending around the mounting and secured to each other on adjoining edges to form an enclosure for the mounting, each segment having a projecting fairing connected thereto and adapted to extend around a radially extending leg on the mounting, said projecting fairing having a substantially airtight connection with the segment.

4. A fairing for a bearing mounting for a turbine including a number of similar segments connected to each other along adjoining edges to form an enclosure around the mounting, a disk to which the fairing segments are secured adjacent their leading edges, and means for releasably clamping the inner edge of the disk to the mounting.

5. A fairing for a bearing mounting for a turbine including a number of similar segments connected to each other along adjoining edges to form an enclosure around the mounting, and a disk having its inner edge releasably clamped by the mounting, said disk extending outwardly and being permanently connected to the fairing segments.

6. A fairing for a bearing mounting for a turbine including a number of similar segments connected to each other along adjoining edges to form an enclosure around the mounting, and a disk welded to said fairing segments adjacent the leading edge of the fairing, said disk having its inner edge releasably clamped to the mounting.

7. A fairing for a bearing mount, having radially extending legs, said fairing including a number of similar segments extending around the mounting and secured to each other on adjoining edges to form an enclosure for the mounting, a fairing for each leg secured to said segments, and a removable cap engaging with one end of said segments and closing one end of the fairing enclosure.

8. A fairing for a bearing mounting for a turbine, said mounting having radially extending legs, said fairing including a number of similar segments connected to each other along adjoining edges to form an enclosure around the mounting, a fairing for each leg secured to said segments, a disk having its inner edge clamped by the mounting, said disk extending outwardly and being permanently connected to the fairing segments, and a removable domed cap engaging with one end of said segments and closing the trailing end of the fairing.

9. A fairing for a bearing mounting including a number of similar segments extending around the mounting and secured to each other on adjoining edges to form an enclosure for the mounting, a threaded ring on the trailing edges of the fairing segments and a domed cap engaging said ring and closing the end of the fairing.

10. A fairing for a bearing mounting for a turbine including a number of similar segments connected to each other along adjoining edges to form an enclosure around the mounting, a disk to which the fairing segments are secured adjacent their leading edges, means for clamping the inner edge of the disk to the mounting, and a removable cap closing the opposite end of the fairing said segments having a ring secured thereto with which the cap engages.

11. A fairing for a bearing mounting for a turbine including a number of similar segments connected to each other along adjoining edges to form an enclosure around the mounting, a disk to which the fairing segments are permanently secured adjacent their leading edges, means for releasably clamping the inner edge of the disk to the mounting, a threaded ring on the fairing segments at the trailing ends, and a domed cap engaging said ring and closing the end of the fairing.

CHARLES A. BARESCH.

REFERENCES CITED

The following references are of record in the file of this patent:

UNITED STATES PATENTS

| Number | Name | Date |
|---|---|---|
| 1,840,902 | Hicks | Jan. 12, 1932 |
| 1,896,222 | Chilton | Feb. 7, 1933 |
| 1,932,231 | Schmidt | Oct. 24, 1935 |
| 2,080,425 | Lysholm | May 18, 1937 |
| 2,178,998 | Scott | Nov. 7, 1939 |
| 2,329,606 | Goodman | Sept. 14, 1943 |